United States Patent [19]

Cwycyshyn et al.

[11] Patent Number: 4,860,864
[45] Date of Patent: Aug. 29, 1989

[54] CLUTCH FOR ROBOT OR LIKE

[75] Inventors: Walter Cwycyshyn, Harsens Island; Frank J. Kudwa, Warren, both of Mich.

[73] Assignee: General Motors Corporation, Detroit, Mich.

[21] Appl. No.: 121,405

[22] Filed: Nov. 16, 1987

[51] Int. Cl.⁴ .................... B25J 17/02; B25J 19/00
[52] U.S. Cl. ..................... 192/56 R; 192/84 PM; 192/150; 901/49
[58] Field of Search ............. 192/84 PM, 56 R150; 901/49; 403/DIG. 1

[56] References Cited

U.S. PATENT DOCUMENTS

| | | | |
|---|---|---|---|
| 2,929,477 | 3/1960 | Rodriguez et al. | 192/84 PM X |
| 3,050,598 | 8/1962 | Fennessy | 200/61.46 |
| 3,166,170 | 1/1965 | Forster et al. | 192/56 R X |
| 3,240,304 | 3/1966 | Wickersham | 192/84 PM X |
| 3,305,058 | 2/1967 | Orwin et al. | 192/56 R |
| 3,603,437 | 9/1971 | Spencer | 192/84 PM X |
| 3,608,686 | 9/1971 | Martin et al. | 192/150 |
| 3,625,328 | 12/1971 | Carli | 192/142 R |
| 3,654,412 | 4/1972 | Haruna et al. | 200/832 |
| 4,209,185 | 6/1980 | St. Clair et al. | 280/734 |
| 4,373,923 | 2/1983 | Kilwin | 192/56 R X |
| 4,424,961 | 1/1984 | Takei | 267/64.27 |
| 4,496,395 | 1/1985 | Croat | 164/462 X |
| 4,514,616 | 4/1985 | Warner | 901/49 X |
| 4,540,331 | 9/1985 | Stanner et al. | 414/730 |
| 4,609,325 | 9/1986 | Gabrielli | 403/DIG. 1 X |
| 4,661,038 | 4/1987 | Kohler et al. | 901/49 X |
| 4,717,003 | 1/1988 | McCormick et al. | 192/56 F |
| 4,725,190 | 2/1988 | Kato | 901/49 X |
| 4,741,642 | 5/1988 | Carlton | 901/49 X |

FOREIGN PATENT DOCUMENTS

| | | | |
|---|---|---|---|
| 0088559 | 9/1983 | European Pat. Off. | |
| 2932661 | 3/1981 | Fed. Rep. of Germany | 192/84 PM |
| 3620391 | 12/1987 | Fed. Rep. of Germany | 901/49 |
| 2445199 | 7/1980 | France | |
| 0236693 | 6/1986 | German Democratic Rep. | 901/49 |
| 0698905 | 11/1979 | U.S.S.R. | |
| 2189458 | 10/1987 | United Kingdom | 901/49 |

Primary Examiner—Rodney H. Bonck
Attorney, Agent, or Firm—Ernest E. Helms

[57] ABSTRACT

The present invention provides a clutch connected between a robot or like and an attached end of arm tooling device (EOAT). The clutch includes two plates having a fixed relationship with one another. Excessive loading on the EOAT beyond predetermined amounts causes the plates to separate from one another. Any deformation in the fixed position of the plates with respect to one another will cause an instantaneous diminishing of a load transmitted between the two plates.

7 Claims, 3 Drawing Sheets

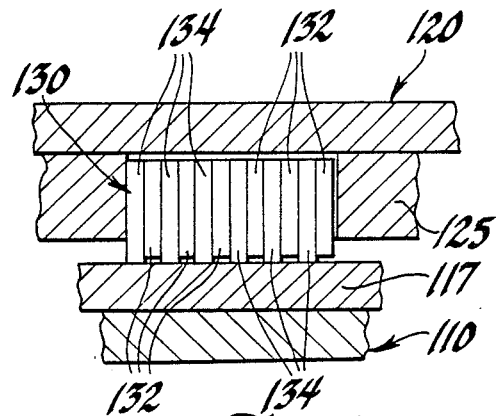
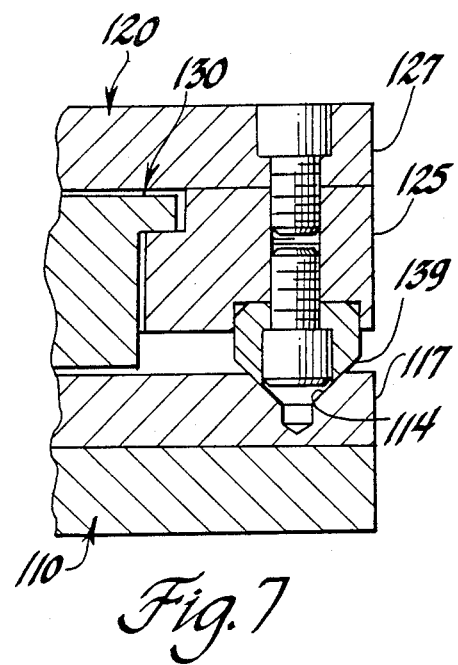
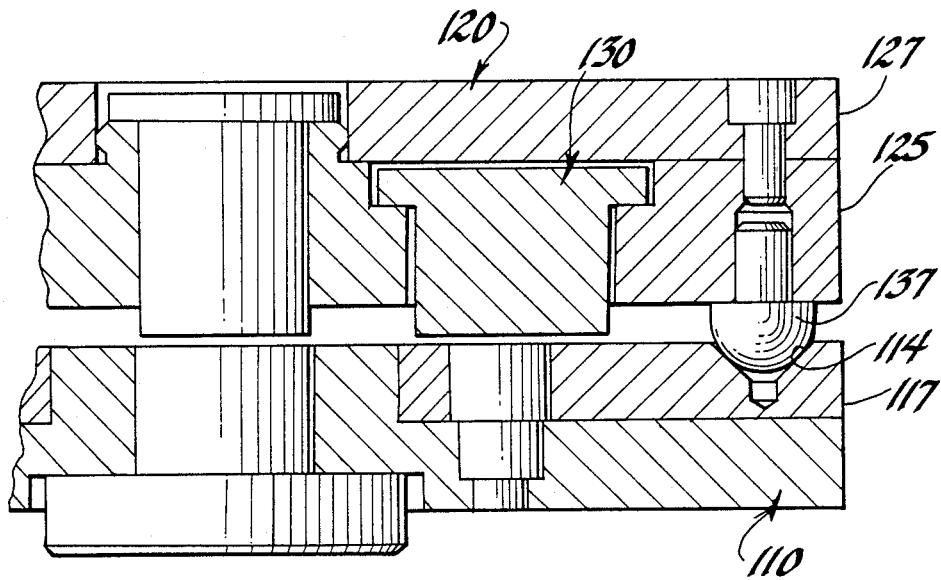

CLUTCH FOR ROBOT OR LIKE

FIELD OF THE INVENTION

The field of the present invention is that of clutches (commonly known as cut-out devices) for connection between a robot or the like and an attached end of arm tooling device (EOAT).

DISCLOSURE STATEMENT

To protect a robot or like and its associated tooling from excessive loading as a result of misprogramming of the robot or like, interference with unintended obstructions, or malfunctions of the tooling, it is common to provide a clutch or cut-out device between the robot or like and the attached EOAT. The clutch provides compliance to prevent damage usually by some form of deformation and often contains a sensor to signal that deformation has occurred so that the robot or like may stop operations. An example of such a device is shown in Stanner et al, U.S. Pat. No. 4,540,331 commonly assigned.

Most clutches are essentially spring loaded mechanical or pneumatic devices and are dependent upon some type of deformation of the spring element to provide the compliance in the case of excessive loading. With a spring-loaded device, normal robot overtravel continues to compress the clutch springs such that overload forces continue to increase for a short period of time after the overload condition is sensed and signaled. In other words although the clutch signals the robot or like to stop, an excessive and often increasing load is still being applied on the EOAT until the robot or like comes to a halt. It is desirable to provide a clutch that can limit and separate the load (placed on the EOAT) from the robot or like at the instant the overload condition is sensed.

In cases of severe or continuous overloads, an operator can be tempted to override and increase the clutch release load by adjusting the springs or increasing the bladder air pressure until the break-away feature of the clutch becomes inoperative. It is, therefore, desirable to provide a break-away clutch that cannot be varied except by design or component replacement.

SUMMARY OF THE INVENTION

To meet the above noted and other desires the present invention is brought forth. The present invention provides a clutch having two plates. One plate connects with the robot or like and the other plate is connected with the EOAT. Means are provided to hold the plates together in a fixed relationship with one another. Deformation of the fixed position between the two plates, i.e. separation thereof, causes the load transmitted between the two plates to be instantaneously diminishing. In a preferred embodiment of the present invention the means for holding the plates together is a magnetic force provided by permanent magnets. The present invention is particular useful when using robots or like for welding and assembly in automotive assembly operations.

It is an object of the present invention to provide an apparatus and method of utilization of the same of a clutch for connection between a robot or like and an attached EOAT.

It is another object of the present invention to provide a clutch adapted for connection between a robot or like and an attached EOAT for deformation upon an applied load on the EOAT beyond a predetermined amount, the clutch including a first plate for connection with the robot or like, a second plate for connection with the EOAT, means holding the first and second plates together in a fixed relationship with one another whereby the plates move relative to one another when the EOAT is loaded beyond a predetermined amount and whereby the load transmitted between the first and second plates diminishes instantaneously upon any deformation in the fixed position between the first and second plates.

It is another object of the present invention to provide a clutch adapted for connection between a robot or like and an attached EOAT for deformation upon an applied load upon the EOAT beyond a predetermined amount, the clutch including a first plate for connection with the robot or like, the first plate having a tapered nest, a second plate for connection with the EOAT having a fixed relationship with respect to the first plate, and the second plate having sensing means to provide a signal to the robot or like upon deformation of the fixed position of the second plate with respect to the first plate, the second plate further including means of connection to allow the second plate to hang from the first plate upon deformation of the fixed position of the second plate with respect to the first plate and the second plate having rotative cam members nested within the tapered cam nests of the first plate whereby rotation of the second plate with respect to the first plate causes the second plate to be urged away from the first plate, and permanent magnets connected with the second plate holding the first and second plates together in a fixed relationship with one another whereby whenever the plates move relative to one another when the EOAT is loaded beyond a predetermined amount the load transmitted between the plates diminishes instantaneously upon any deformation in the fixed position between the first and second plates.

It is yet still another object of the present invention to provide a method of attaching an EOAT to a robot or like utilizing a clutch, the method including connecting with the robot or like a first plate, connecting with the EOAT a second plate, and holding the first and second plates together in a fixed relationship with one another whereby the plates move relative to one another when the EOAT is loaded beyond a predetermined amount and the load transmitted between the first and second plates diminishes instantaneously upon any deformation in the fixed position between the first and second plates.

Other objects, desires and advantages of the invention will become more apparent to those skilled in the art as the nature of the invention is better understood from the accompanying drawings and a detailed description.

BRIEF DESCRIPTION OF THE DRAWINGS

FIG. 5 is a cut-away view taken along line 5—5 of FIG. 3;

FIGS. 6 and 7 are cut-away sectional views of alternative embodiments of the present invention from those illustrated in FIGS. 1 and 3.

DETAILED DESCRIPTION OF THE DRAWINGS

Figure 1:
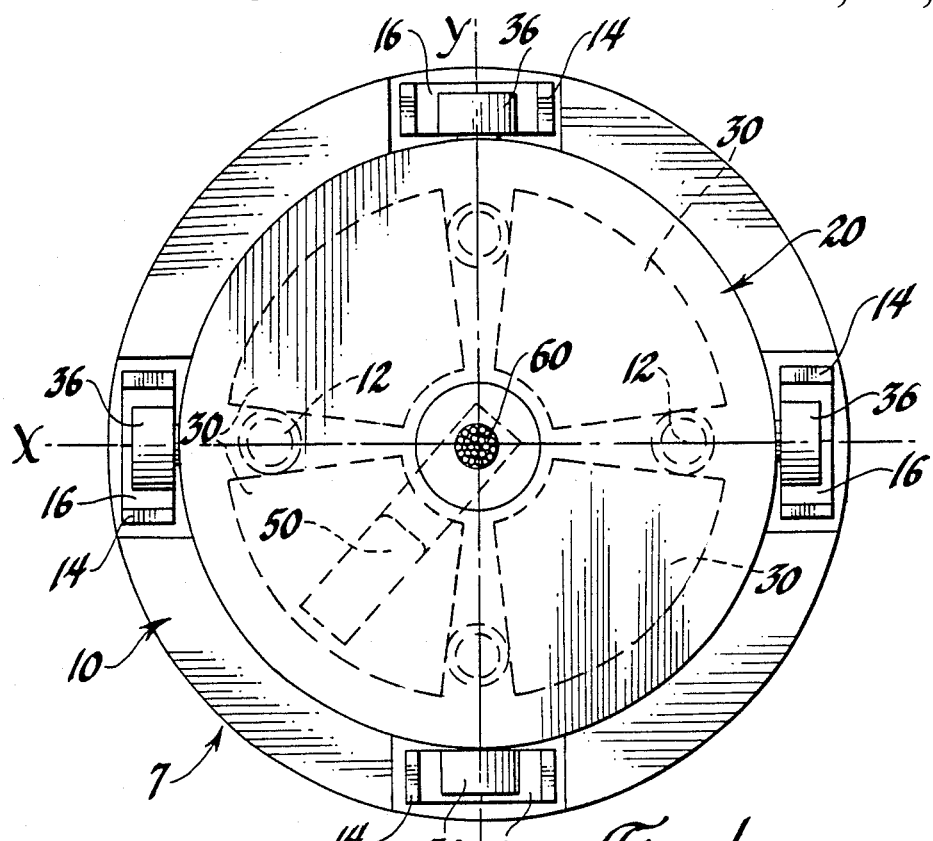
FIG. 1 is a top plan view of a preferred embodiment clutch of the present invention.
Figure 2:
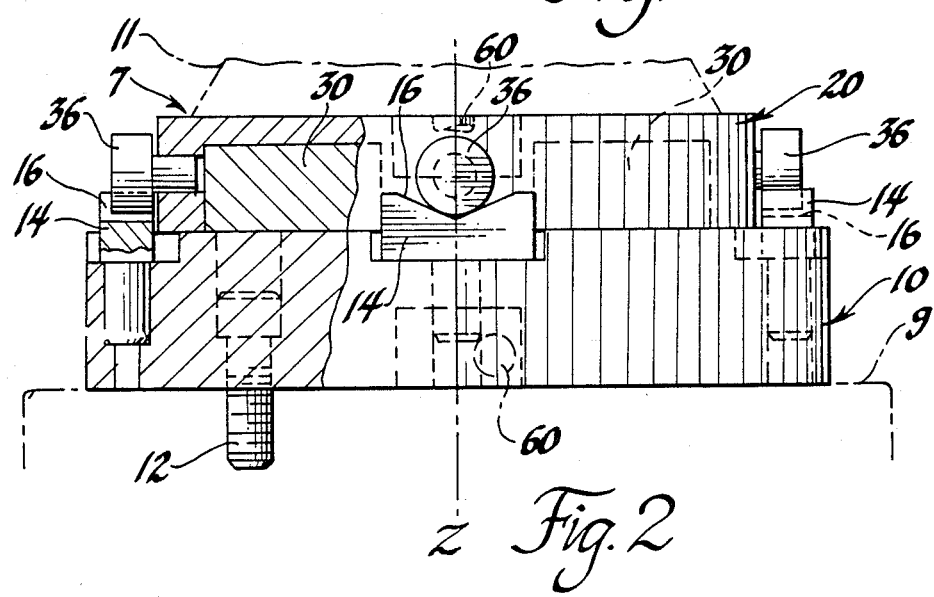
FIG. 2 is a front sectional view mainly in front elevation of the clutch illustrated in FIG. 1.

Referring to FIGS. 1 and 2 the clutch 7 is adapted for connection between a robot 9 or like and an attached EOAT 11. The clutch 7 has a first plate 10 for connection with the robot 9 by a series of bolts 12. Opposite the first plate and having a fixed position with respect thereto is a second plate 20. The second plate 20 is adapted for connection with the EOAT 11.

The second plate 20 has connected thereto four permanent Magnequench magnet cells 30. A more detailed explanation of such magnets as noted above can be gained by a review of U.S. Pat. No. 4,496,395 commonly assigned. The magnets 30 provide the means to hold the first 10 and second 20 plates together in a fixed relationship with one another. The first plate 10 also has a series of insertable cam tapered nests 14. The second plate 20 has rotatively mounted thereto series of cam rollers 36 which are nested within the previously described tapered cam nests 14. The clutch 7 also has a sensor means 50 which transmits a signal to the robot 9 upon any separation of the plates from one another. To prevent the EOAT from falling off away from the robot, there is provided a retention cable 60 which provides the means to allow the second plate 20 to hang from the first even though plates 10, 20 have separated from one another.

In the environment of robotic welders in automotive assembly plants most of the EOAT weld guns have contact tips which are off center. Therefore excessive loading on the gun (EOAT) will usually cause a torsional force component of a transverse force of at least one linear coordinates axis (X,Y) or of at least one of three moment forces along coordinate axis to be exerted upon the second plate 20. The torsional force exerted upon the second plate 20 causes movement of the second plate 20. The cam rollers roll up the tapered surfaces 16 of the cam nest 14 thereby separating the second plate 20 from the first plate 10. The tapered angle of the cam nest 14 determines the torsional force required for the second plate 20 to move from its fixed position with respect to the first plate 10. Therefore the holding force required can be easily adjusted for the different applications by replacing the cam nest 14 with a taper at a different angle and/or by substitution of a magnet 30 with a different magnetic force. The separation of the second plate 20 from the first plate 10 activates the sensor 50 to signal for the cessation of the robot 9.

Upon the displacement of the second plate 20 relative to the first plate 10, the magnetic force holding the second plate 20 to the first plate 10 instantaneously diminishes. Therefore upon excessive loading on the EOAT the force transmitted between the first 10 and second 20 plates and in like manner the force transmitted between the EOAT 11 or a workpiece (not shown) and robot 9 instantly diminishes. Also, force or torque is prevented from being transmitted to the robot drive.

Clutch 7 will also operate in the manner noted above when an excessive tensional force acts upon the EOAT 11 pulling it away from robot 9.

Figure 3:
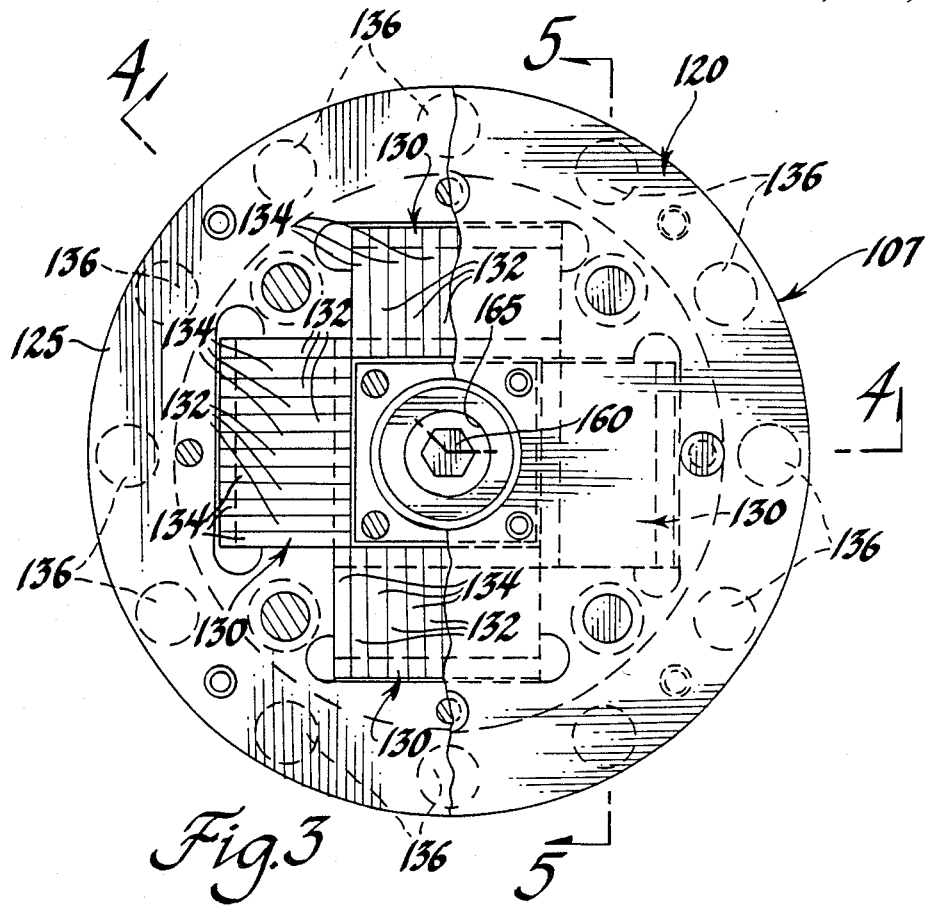
FIG. 3 is a top sectional view of an alternative preferred embodiment clutch of the present invention.
Figure 4:
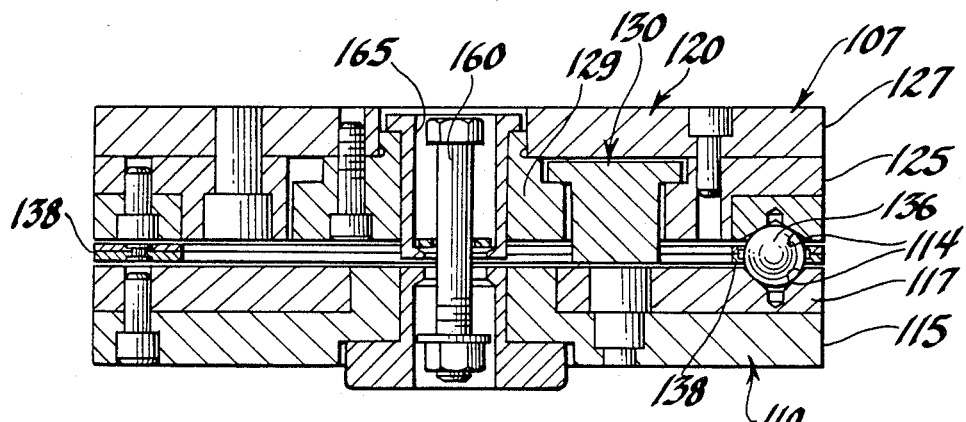
FIG. 4 is a view taken along line 4—4 of FIG. 3.

Referring to FIGS. 3, 4 and 5 an alternative embodiment of the clutch to that previously presented is illustrated. The clutch 107 has a combination type plate construction in the first 110 and second 120 plates utilizing aluminum in certain portions (115, 125, 127, 129) to minimize weight and a ferro magnetic material in another portion 117 to provide the magnetic field necessary. The above design also maximizes the density of the magnetic flux by eliminating magnetic flux in other portions of the clutch 107. To allow the second plate 120 to hang from the first plate 110 upon separation there is provided a loose-fitting fastener with a head and an attached nut which extends through a central aperture 165. Aperture 165 extends through both of the plates 110, 120. The magnet cell 130 utilized is serrated with an alternating design of steel 132 and magnet material 134. The steel 13 serves as flux line guidance to direct a magnetic flux circuit thereby providing greater retentional power between the first 110 and second 120 plates.

The first plate 110 has a series of tapered cam nests 114. Placed in the tapered cam nests 114 is a series of roller bearings 136 which are captured in a roller bearing ring 138 which is in turn between the first 110 and second 120 plates and connected with the plate 120. Torsional loading beyond a predetermined limit will cause the second plate 120 to rotate with respect to the first plate 110 causing the first 110 and second 120 plates to separate with respect to one another. In like manner there is also provided a sensor (not shown) to sense separation of the second plate 120 with respect to the first plate 110 and therefore signal to robot to cease operations.

Referring additionally to FIG. 6, an alternative embodiment is provided using a spherical post 137 which is fixedly connected with the second plate 120 and again is nested into the cam tapered nests 114 of the first plate 110. Still another alternative embodiment is provided in FIG. 7 which utilizes a conical ring 139 which is fixably connected with the second plate 120 and is nested within a tapered cam nest 114 of the first plate 110. The conical ring embodiment additionally provides a locator mechanism for insuring proper positioning of the first 110 and second 120 plates during assembly.

The present invention provides a method of attaching an EOAT to a robot or like utilizing a clutch, including the following steps:

1. Connecting with the robot 9 or like a first plate 10;
2. Connecting with the EOAT 11 a second plate 20;
3. Holding the first 10 and second 20 plates together in a fixed relationship with one another whereby the plates move relative to one another when the EOAT 11 is loaded beyond a predetermined amount and the load transmitted between the first 10 and second plates 20 diminishes instantaneously upon any deformation in the fixed position between the first 10 and second 20 plates.

While a few of the embodiments of the present invention have been explained, it will be readily apparent to those skilled in the art of the various modification which can be made to the present invention without departing from the spirit and scope of this application as it is encompassed by the following claims.

The embodiments of the invention in which an exclusive property or privilege is claimed are defined as follows:

1. A clutch adapted for connection between a robot or like and an attached end of arm tool (EOAT) for separation upon an applied load upon said EOAT beyond a predetermined amount, said clutch in combination comprising:
    a first plate for connection with said robot or like, said first plate having tapered masts;

a second plate for connection with said EOAT having a fixed relationship with respect to said first plate, and said second plate having sensing means to provide a signal to said robot or like upon separation of said second plate from said first plate, said second plate further including means of connection to allow said second plate to hang from said first plate upon separation of said second plate from said first plate and said second plate having rotative cam members nested within said tapered cam nests of said first plate whereby rotation of said second plate with respect to said first plate causes said second plate to be urged away from said first plate; and permanent magnets connected with said first second plate holding said first and second plates together in a fixed relationship with one another whereby said second plate moves relative to said first plate when said second plate is moved torsionally along at least one of three coordinate axis or transversely along at least one of two linear axis via an applied load on said EOAT beyond a predetermined amount and the load transmitted between said plates diminishes instantaneously upon any separation of said second plate from said first plate.

2. A method of attaching an end arm tool to a robot or like utilizing a clutch, said method in combination comprising:

connecting with said robot or like a first plate;
connecting with said EOAT a second plate;
nesting a cam surface located on one of said plates in a tapered nest of said plate opposite said plate said cam surface is located on; and holding said first and second plates together in a fixed relationship with one another with a permanent magnet connected on one of said plates whereby said second plate moves relative to said first plate when said second plate is moved torsionally along at least one of three coordinate axis or transversely along at least one of two linear axis via an applied load on said EOAT beyond a predetermined amount, and the load transmitted between said first and second plates diminishes instantaneously upon any separation of said second plate from said first plate.

3. A clutch adapted for connection between a robot and an attached end of arm tool for separation upon an applied load on said EOAT beyond a predetermined amount, said clutch in combination comprising:

a first plate for connection with said robot or like;
a second plate for connection with said EOAT;
cam surfaces located on one of said plates;
tapered nests on said plate opposite said plate said cam surfaces are located on, said cam surfaces being received into said tapered nest to locate said plates in a fixed relationship to one another; and a permanent magnet fixably connected with one of said plates holds said first and second plates in said fixed relationship with one another whereby said second plate moves relative to said first plate when said second plate is moved torsionally along at least one of three coordinate axis or transversely along at least one of two coordinate linear axis via an applied load on said EOAT beyond a predetermined amount and the load transmitted between said first and second plates diminishes instantaneously upon said movement of said second plate with respect to said first plate.

4. A clutch as described in claim 3 wherein said cam surfaces includes a roller rotatably mounted to said plate said cam surface is located on.

5. A clutch as described in claim 3 wherein said cam surface includes a conical ring connected with said plate said cam surface is located on and said opposite plate having a conical surface for nesting said ring.

6. A clutch as described in claim 3 further including connecting means allowing said second plate to hang from said first plate upon separation of said second plate from said first plate.

7. A clutch as described in claim 3 further including sensing means for sensing the separation of said second plate from said first plate, said sensing means providing a signal for cessation of said robot or like.

* * * * *